United States Patent [19]
Hellsten et al.

[11] 3,928,061
[45] Dec. 23, 1975

[54] ASPHALT COMPOSITIONS HAVING IMPROVED ADHESION TO AGGREGATE

[75] Inventors: Martin Edvin Hellsten, Odsmal; Anders William Klingberg; Stig Erik Svennberg, both of Stenungsund, all of Sweden

[73] Assignee: Mo och Damsjo Aktiebolag, Ornskaldsvit, Sweden

[22] Filed: Apr. 23, 1973

[21] Appl. No.: 353,271

[30] Foreign Application Priority Data
Apr. 26, 1972 Sweden.............................. 5527/72

[52] U.S. Cl.............. 106/273 N; 106/276; 106/277; 106/278; 106/279; 252/311.5; 260/584 B; 106/281 N
[51] Int. Cl.²..................... C08L 95/00; C09D 3/24
[58] Field of Search................ 260/584 B, 278, 277; 106/273 N, 279, 281 N

[56] References Cited
UNITED STATES PATENTS

| | | | |
|---|---|---|---|
| 2,355,337 | 8/1944 | Spence............................ | 260/584 B |
| 2,534,713 | 12/1950 | Hankins........................... | 106/273 N |
| 2,679,462 | 5/1954 | Monson........................... | 106/273 N |
| 2,690,978 | 11/1954 | Cross................................... | 106/277 |
| 2,856,308 | 11/1958 | Suprin et al. .................... | 106/281 N |
| 3,060,210 | 10/1962 | Groove et al. ................... | 106/281 N |
| 3,108,971 | 10/1963 | Mertens.............................. | 106/277 |
| 3,259,512 | 7/1966 | Dickson et al................... | 106/273 N |

FOREIGN PATENTS OR APPLICATIONS

| | | | |
|---|---|---|---|
| 659,457 | 10/1951 | United Kingdom............. | 106/273 N |
| 773,622 | 5/1957 | United Kingdom............. | 106/273 N |

*Primary Examiner*—Joseph L. Schofer
*Assistant Examiner*—Herbert J. Lilling

[57] ABSTRACT

Asphalt compositions are provided having improved adhesion to aggregate, comprising an alkyl oxyalkylene amine and, optionally, an alkanolamine.

19 Claims, No Drawings

ASPHALT COMPOSITIONS HAVING IMPROVED ADHESION TO AGGREGATE

Asphalt compositions have relatively poor adhesion to aggregate in the presence of water. Aggregate is preferentially wetted by water, so that even if the aggregate be dry at the time it is blended with the asphalt, in the course of time the penetration of water into the asphalt composition reaches the aggregate and then interferes with the bond between the aggregate and the asphalt, leading to separation of the asphalt from the aggregate, with resulting breakup of the composition. If, for example, it is in the form of a paving material, flaked pavement and potholes result.

The adhesion between asphalt and aggregate is greatly improved by the addition of a cationic substance, such as an amine. The additive increases the hydrophobicity of the aggregate, so that the aggregate becomes resistant to the penetration of water, as a result of which water seeping into the asphalt does not tend to destroy the bond between the asphalt and the aggregate. If the aggregate is water-resistant, water does not prevent the formation of a good bond with the asphalt, even when the aggregate is wet. The result is an increased pavement life.

The cationic additives used for this purpose are normally the primary alkyl amines, such as lauryl amine, stearyl amine, and the alkylene diamines, particularly the alkyl-substituted alkylene diamines, such as N-stearyl-1,3-propylene diamine, are widely used for this purpose. However, these amines rapidly lose their activity when combined with the asphalt and stored at elevated temperatures. It has therefore been necessary to combine the amine with the asphalt at the work site, where the asphalt is combined with the aggregate. It is, however, difficult to combine the proper quantity of additive with the asphalt on site, and obtain a homogeneous mixture. There is also a certain danger in doing so since the amines are toxic.

In order to avoid these difficulties, tertiary alkyl amines, aromatic amines, and heterocyclic amines have been used. These amines are more stable at elevated temperatures than primary amines, but they have a lesser activity, and much larger amounts are required, for the same degree of adhesion. Primary alkyl amines have also been condensed with ethylene oxide, but the resulting adducts have the same limitations.

In accordance with the instant invention, it has now been determined that the adhesion of asphalt to aggregate can be appreciably improved by combining with the asphalt an ether amine having the general formula:

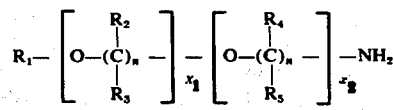

wherein:

$R_1$ is a hydrocarbon group having from about six to about 16 carbon atoms;

$R_2$, $R_3$, $R_4$ and $R_5$ are selected from the group consisting of hydrogen and alkyl radicals having from one to about two carbon atoms;

$n_1$ and $n_2$ are numbers within the range from one to about four;

$x_1$ and $x_2$ are numbers within the range from zero to about five, the sum of $x_1$ and $x_2$ being from one to five; the total number of carbon atoms in each

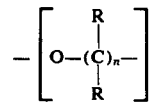

unit being from one to about four.

An especially preferred class of ether amines in accordance with the invention are those in which $R_1$ is an alkyl group having from eight to about 14 carbon atoms, the number of carbon atoms in each

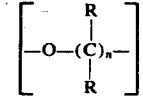

unit is two or three, $x_1$ is one, and $x_2$ is zero.

Exemplary $R_1$ substituents are hexyl, isohexyl, heptyl, octyl, 2-ethylhexyl, isooctyl, nonyl, tertiary nonyl, decyl, dodecyl, tridecyl, myristyl, palmityl, hexenyl, heptenyl, octenyl, nonenyl, decenyl, dodecenyl, and tridecenyl.

Exemplary $R_2$, $R_3$, $R_4$ and $R_5$ alkyl substituents are methyl, ethyl.

Exemplary ether amines in accordance with the invention are octoxyethylamine, decoxyethylamine, dodecoxyethylamine, tetradecoxyethylamine, hexoxypropylamine, octoxypropylamine, nonoxypropylamine, decoxypropylamine, dodecoxypropylamine, tetradecoxypropylamine, palmityloxypropylamine, myristyloxypropylamine, hexyl dioxyethylene oxyethylamine, octyl trioxyethylene oxyethylamine, dodecyl tetraoxyethylene oxyethylamine, myristyl dioxyethylene oxypropylamine, octyl tetraoxyethylene oxypropylamine, dodecyl tetraoxyethylene oxypropylamine, octyl dioxypropylene oxypropylamine, decyl trioxypropylene oxyethylamine, tetradecyl tetraoxypropylene oxypropylamine, octyl oxypropylene oxypropylamine, palmityl tetraoxypropylene oxypropylamine, heptenyl oxypropylene oxypropylamine, decenyl dioxyethylene oxyethylamine, octenyl oxypropylene oxyethylamine, dodecenyl tetraoxypropylene oxypropylamine, octyloxybutylene oxbutylamine, decyl trioxybutylene oxybutylamine, dodecyl tetraoxybutylene oxyethylamine, palmityl dioxybutylene oxypropylamine, decyl tetraoxypropylene oxypropylamine, and dodecyloxy propylene oxyethylamine.

The ether amine additives in accordance with the invention can be prepared from an adduct of an alcohol and the corresponding alkylene glycol, such as an adduct of octyl alcohol and ethylene glycol, replacing the hydroxyl group by halogen, preferably chlorine, and then reacting the resulting halogen compound with ammonia. Alternatively, the alcohol or alkylene oxide adduct can be reacted with acrylonitrile, and the resulting reaction product then hydrogenated. Direct amination of the alkylene oxide adduct in the presence of a suitable catalyst also results in the ether amine. Other suitable methods include the reaction of the corresponding alcohol with formaldehyde and hydrochloric acid, the chlorine-containing ether compound then being reacted with ammonia. One also may employ alkene compounds having a suitable chain length, reacting them with a monoalkanolamine having from two to about four carbon atoms.

The ether amines in accordance with the invention have a superior thermal stability in hot asphalt compositions. Their thermal stability can be further improved by combining therewith an alkanolamine having the formula:

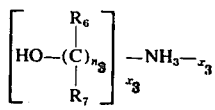

wherein:

$R_6$ and $R_7$ are selected from the group consisting of hydrogen and alkyl groups having from one to about two carbon atoms;

$n_3$ is a number within the range from two to about four;

$x_3$ is a number within the range from one to about three;

the total number of carbon atoms in each

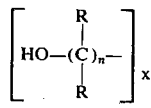

unit being within the range from two to four.

The alkanolamine by itself has no noticeable effect upon the adhesion of the asphalt to aggregate. However, in combination with the ether amine, the adhesion of the asphalt to aggregate is greatly improved, suggesting that there is a synergistic effect on the adhesion properties of the ether amine. This effect cannot be explained at the present time, but it is suggested that possibly the alkanolamine in some way improves the stability of naphthenic acids present in the asphalt, which break down and/or inactivate the ether amine at elevated temperatures. The result is an improved thermal stability of the asphalt composition, which tends to retain good adhesion to aggregate even when held at elevated temperatures for long periods of time.

Exemplary $R_6$ and $R_7$ substituents in the alkanolamines are methyl, ethyl.

Exemplary alkanolamines are monoethanolamine, diethanolamine, triethanolamine, monoisopropanolamine, diisopropanolamine, triisopropanolamine, monoisobutanolamine, diisopropanolamine, triisopropanolamine, monoisobutanolamine, diisobutanolamine, triisobutanolamine, mono-n-propanolamine, di-n-propanolamine, tri-n-propanolamine, mono-n-butanolamine, di-n-butanolamine, and tri-n-butanolamine.

When the ether amine is used in combination with an alkanolamine, the two amines are preferably added together to the asphalt. If desired, the ether amine and alkanol amine can be premixed, for addition to asphalt and aggregate at the work site.

When alkanolamine and ether amine are used together, the proportions of alkanolamine and ether amine are in no way critical. The amount of alkanolamine can be within the range from about 0 to about 90% by weight, preferably within the range from about 10 to about 70% by weight, of the ether amine. The upper limit is imposed by the diluting effect of the alkanolamine, which, when used alone, has no capability of improving the adhesion of asphalt to aggregate. Consequently, as the amount of alkanolamine becomes greater, the adhesive effect of the diluted ether amine begins to be reduced. Therefore, the upper limit of alkanolamine is normally about 90% by weight of the ether amine. However, larger amounts of alkanolamine can be used if the ether amine has a strong effect on the adhesion of asphalt to aggregate.

The amount of ether amine in the asphalt-aggregate composition depends upon the adhesive effect desired. An amount of ether amine as low as 0.1% gives an improved adhesion of asphalt to aggregate. As the amount of ether amine increases, the effect on the adhesion appears less, and amounts in excess of 5% weight of the asphalt do not appear to greatly improve adhesion to aggregate. Consequently, although amounts in excess of 5% can be used, such amounts are wasteful. Amounts in excess of 10% are not required. The preferred amount is within the range from about 0.5 to about 4% by weight of the asphalt, within which range the optimum effect on adhesion is observed.

The ether amines in accordance with the invention improve the adhesion to aggregate of any kind and form of asphalt composition.

The term "asphalt" as used herein is applied to an asphalt suitable for direct use in highway work, roofing, and also for other purposes, and includes asphalts brought to a consistency desired for particular use, either by distillation or by mixing or fluxing with a harder or a softer asphalt, as the case may be. The term "asphalt" also includes asphaltic rocks, tars and pitches obtained in the distillation of coal or wood, or obtained from petroleum residues, cracking coal tars, or other types of natural asphalts. One type of asphalt is commonly known as "asphalt cement." Asphalt cement is a highly viscous product obtained by oxidizing or steam-blowing a petroleum residue to increase its penetration.

In using asphalt in road paving operations, three different procedures are employed. In one procedure adapted for use of asphalt cement, the asphalt is heated until free-flowing, and then mixed directly with the aggregate, which may also be heated. In a second procedure, to enable application of asphalt to aggregate at room temperature, the asphalt is dissolved in a hydrocarbon solvent. Such compositions are known as "cut-back" asphalts. This method of asphalt application is expensive not only because of the solvent but also because considerable time is required to remove the solvent once mixing has been completed.

In the third method, the asphalt is emulsified with water. The emulsion can either be of the so-called oil-in-water type in which the asphalt is emulsified in the inner phase, or the emulsion can be of the water-in-oil type in which water is in the inner phase. The particles of asphalt in the emulsion range from about one to about twenty microns in size, and the emulsion is free-flowing at ordinary temperatures. Asphalt emulsions are generally made in three types: RS or rapid-setting type, MS or medium-setting type, and SS or slow-setting type. The RS type is subdivided into two categories having different viscosities, namely, RS–1 and RS–2.

Asphalt emulsions are prepared by dispersing molten asphalt in water in the presence of an emulsifying agent, to form a cationic, anionic or nonionic emulsion, the character of the emulsion depending upon the nature of the emulsifying agent. The cationic and anionic emulsions are much more common than the nonionic emulsion.

Aggregate normally constitutes from about 90 to about 96% by weight of asphalt-aggregate mixtures. The most commonly used aggregates are broken stone and slag, crushed or uncrushed gravel, crushed limestone, disintegrated granite, sand and mineral filler. The type of asphalt and the ultimate properties desired determine the type of aggregate to be employed. Chemically, these aggregates can comprise calcium carbonate, calcium silicate, silicon dioxide and various iron, aluminum and other mineral-containing substances.

Further details on methods of combining aggregate and asphalt emulsions and on proper proportions of the various sizes of aggregate for use in different construction applications may be found in a publication, *The Asphalt Handbook*, Revised Edition, 1960, published by The Asphalt Institute, College Park, Md.

In preparing the asphalt compositions of the invention, asphalt can be mixed with any of the common aggregates, such as crushed limestone, slag, crushed rock, sand, gravel, etc., to form an asphaltic concrete for paving. Silica-containing aggregates are however preferred. The desirable properties for such an asphalt cement may be found in highway specification manuals or in Abraham's text, *Asphalt and Allied Substances*. In general, asphalt cement for paving purposes is required to meet penetration specifications, and the preferred penetration will usually be from 50 to 200 at 77°F.

In preparing an asphaltic concrete for paving, the asphalt is mixed with aggregate in the proportion of from 4 to 10 parts by weight of asphalt to 96 to 90 parts by weight of aggregate at a temperature in the range of from 280° to 350°F, but preferably the temperature will be selected to give 120 seconds viscosity (Saybolt-Furol) for the asphalt cement employed.

The following Examples in the opinion of the inventors represent preferred embodiments of the invention.

EXAMPLE 1

To 200g of asphalt solution (containing 170g of petroleum residue asphalt dissolved in naphtha to form a solution there was added 3g. of 3-decoxypropylamine. The resulting solution was then held for one day at 130°C in a sealed container. The container was then opened, and about 9g. of the asphalt solution poured out on a sheet-metal disc having a diameter of 9cm. The disc was held at 20°C, and after 30 minutes, 20 wet stones (granites from the Stockholm area, Sweden) size 8 to 11mm in diameter that had been washed in deionized water were pressed down into the asphalt layer. After another 30 minutes, the stones were taken out, using a pair of tweezers, and were judged visually in respect of the surface area covered with asphalt, calculated in percent of the surface area which had been in contact with the asphalt. The average percent surface area of the 20 stones represented the adhesion, and the adhesion was found to be 97% by this test.

When the solution has been held for 2 days at 130°C, the adhesion was found to be 84%, and after 4 days at 130°C, the adhesion was found to be 74%.

For comparison purposes, a similar composition was prepared using 200g. of the same asphalt solution but adding 3g. of dodecylamine. The asphalt solution was stored at 130°C, and tested for adhesion to the stones using the same test procedure. After 1 day, 2 days and 4 days at this temperature, the adhesion was found to be 76%, 70% and 59%, respectively. Thus, 3-decoxypropylamine showed considerably better capability for improving the adhesion of the asphalt to aggregate than dodecylamine.

EXAMPLES 2 to 5

EXAMPLE 2

To 200g. of the same asphalt solution used in the tests of Example 1, there was added 3g. of decoxypropylamine and 3g. of monoethanolamine. The asphalt solution was then stored at 130°C for 24 days. Samples of the composition were removed at 1 day, 2 days, 4 days, 8 days, 12 days, 16 days, and 24 days, and tested for adhesion to aggregate using the test procedure outlined in Example 1. The results are reported in Table I*a*.

EXAMPLE 3

A similar composition was prepared using 3g. of decoxypropylamine and 3 g. of diethanolamine, and these results are also reported in Table I*a*.

EXAMPLE 4

Similarly, asphalt compositions were prepared using 3g. of 3-decoxypropylamine and 3g. of triethanolamine, and

EXAMPLE 5 using 3g. of 3-decoxypropylamine and 3g. of monoisopropanolamine. The test results are reported in Table I*a*.

For comparison purposes, the tests were run in parallel to an asphalt solution containing 3g. of 3-decoxypropylamine but no alkanolamine, and 3g. of dodecylamine but no alkanolamine. The results appear in Table I*a*.

For comparison purposes, the tests were also run in parallel to three asphalt compositions each containing 3g. of one of the alkanolamines tested, and one asphalt composition containing no additive. The % adhesion in each case is given in Table I*b*.

TABLE I*a*

| Ex. No: | 1 | 2 | 3 | 4 | 5 | Control A |
|---|---|---|---|---|---|---|
| Days at 130° | Ether-Amine No Alkanolamine | Additive: 3-decoxypropylamine plus Mono-ethanol-amine | Di-ethanol-amine | Tri-ethanol-amine | Mono Isopropanol-amine | Amine Additive: Dodecyl-amine |
| 1 | 97 | 99 | 98 | 97 | 97 | 76 |
| 2 | 84 | 98 | 95 | 96 | 95 | 70 |
| 4 | 74 | 95 | 93 | 95 | 93 | 59 |
| 8 | 42 | 93 | 91 | 91 | 90 | 40 |
| 12 | 26 | 92 | 89 | 90 | 84 | 25 |
| 16 | 18 | 93 | 87 | 89 | 80 | 14 |
| 20 | 12 | 92 | 86 | 85 | 78 | 6 |
| 24 | 9 | 91 | 85 | 82 | 76 | — |

TABLE I*b*

| | Adhesion % Controls: No ether amine 1.5% Alkanolamine: | | | | Control F |
|---|---|---|---|---|---|
| Days at 130°C | B Mono-ethanol | C Di ethanol | D Tri-ethanol | E Isopropanol | No Amine |
| 1 | —[1] | — | — | — | — |
| 2 | — | — | — | — | — |
| 4 | — | — | — | — | — |
| 8 | — | — | — | — | — |
| 12 | — | — | — | — | — |
| 16 | — | — | — | — | — |

TABLE Ib—Continued

| Days at 130°C | Adhesion % Controls: No ether amine 1.5% Alkanolamine: | | | | Control F |
|---|---|---|---|---|---|
| | B Mono-ethanol | C Di-ethanol | D Tri-ethanol | E Isopro-panol | No Amine |
| 20 | — | — | — | — | — |
| 24 | — | — | — | — | — |

[1]The values obtained were in the range 0 – 5% which also is the precision of the test method.

The 3-decoxypropylamine gives a considerable improvement over dodecylamine.

The alkanolamine further improves the thermal stability of the asphalt solutions containing 3-decoxypropylamine. The adhesion after 24 days at 130°C with each of the alkanolamines tested was superior not only to that obtained using dodecylamine alone, but was still comparable to that using 3-decoxypropylamine alone after 2 to 4 days at the same temperature. The alkanolamines alone were ineffective, and % adhesion was equal to that obtained when no amine was present.

EXAMPLES 6 to 9

EXAMPLE 6

To 200g. of the same asphalt solution used in the tests of Example 1, there were added 3g. of decoxypropylamine. The asphalt solution was then stored at 130°C for 20 days. Samples of the composition were removed at 1 day, 2 days, 4 days, 8 days, 12 days, 16 days, and 20 days, and tested for adhesion to aggregate, using the test procedure outlined in Example 1. The results are reported in Table II.

EXAMPLE 7

A similar composition was prepared, using 3g. of decoxypropylamine and 1g. of diethanolamine, and these results are also reported in Table II.

EXAMPLE 8

Similarly, asphalt compositions were prepared using 3g. of 3-decoxypropylamine and 2g. of diethanolamine, and

EXAMPLE 9 using 3g. of 3-decoxypropylamine and 3g. of diethanolamine. The test-results are reported in Table II.

TABLE II

| Example No: | 6 | 7 | 8 | 9 | Control |
|---|---|---|---|---|---|
| | Adhesion % | | | | |
| | Ether Amine Additive: 1.5% 3-decoxypropylamine plus | | | | |
| Days at 130°C | No Alkanol-amine | 0.5% Di-ethanol-amine | 1.0% Di-ethanol-amine | 1.5% Di-ethanol-amine | No Additive |
| 1 | 91 | 96 | 98 | 100 | —[1] |
| 2 | 82 | 95 | 97 | 99 | — |
| 4 | 68 | 92 | 96 | 98 | — |
| 8 | 45 | 86 | 93 | 95 | — |
| 12 | 29 | 80 | 91 | 92 | — |
| 16 | 19 | 75 | 89 | 89 | — |
| 20 | 10 | 67 | 86 | 87 | — |

[1]The values obtained were in the range 0 – 5% which also is the precision of the test method.

The 3-decoxypropylamine gave good adhesion in this test compared to the control.

The effect of the diethanolamine in further improving the thermal stability of the compositions with 3-decoxypropylamine is quite remarkable. The adhesion after 20 days at 130°C at 1% and 1.5% diethanolamine was superior to that obtained using 3-decoxypropylamine alone after 2 days at the same temperature.

EXAMPLES 10 to 12

EXAMPLE 10

To 200g. of the same asphalt solution used in the tests of Example 1, there were added 3g. of 3-octoxypropylamine. The asphalt solution was then stored at 130°C for 20 days. Samples of the composition were removed at 1 day, 2 days, 4 days, 8 days, 12 days, 16 days, and 20 days, and tested for adhesion to aggregate, using the test procedure outlined in Example 1. The results are reported in Table III.

EXAMPLE 11

A similar composition was prepared using 3g. of 3-octoxypropylamine and 3g. of monoethanolamine, and these results are also reported in Table III.

EXAMPLE 12

Similarly, an asphalt composition was prepared using 3g. of 3-octoxypropylamine and 3g. of diethanolamine. The test results are reported in Table III.

TABLE III

| Example No: | 10 | 11 | 12 | Control |
|---|---|---|---|---|
| | Adhesion % | | | |
| | Ether Amine Additive: 1.5% 3-octoxypropylamine | | | |
| Days at 130°C | No Alkanol-amine | 1.5% Monoethanol-amine | 1.5% Diethanol-amine | No Additive |
| 1 | 85 | 99 | 93 | —[1] |
| 2 | 85 | 99 | 93 | — |
| 4 | 83 | 98 | 93 | — |
| 8 | 75 | 97 | 92 | — |
| 12 | 61 | 96 | 89 | — |
| 16 | 40 | 95 | 86 | — |
| 20 | 13 | 94 | 81 | — |

[1]The values obtained were in the range 0 – 5% which also is the precision of the test method.

The 3-octoxypropylamine gave good adhesion in these tests, compared to the control.

The alkanolamine further improved the thermal stability of the asphalt solutions containing 3-octoxypropylamine. The adhesion after 20 days at 130°C in the case of monoethanolamine was superior to that obtained using 3-decoxypropylamine alone after 2 days at the same temperature. Diethanolamine gives results after 20 days comparable to 3-decoxypropylamine alone after 5 days.

EXAMPLES 14 to 16

EXAMPLE 14

To 200g. of the same asphalt solution used in the tests of Example 1, there were added 3g. of 3-tetradecoxypropyl amine. The asphalt solution was then stored at 130°C for 20 days. Samples of the composition were removed at 1 day, 2 days, 4 days, 8 days, 12 days, 16 days, and 20 days, and tested for adhesion to aggregate, using the test procedure outlined in Example 1. The results are reported in Table IV.

EXAMPLE 15

A similar composition was prepared using 3g. or 3-tetradecoxypropylamine and 3g. of monoethanolamine, and these results are also reported in Table IV.

EXAMPLE 16

Similarly, an asphalt composition was prepared using 3g. of 3-tetradecoxypropylamine and 3g. of diethanolamine. The test results are reported in Table IV.

TABLE IV

| Example No: | 14 | 15 | 16 | Control |
|---|---|---|---|---|
| | Adhesion % | | | |
| Ether Amine Additive: 1.5% 3-tetradecoxypropylamine | | | | |
| Days at 130°C | 1.5% No Alkanolamine | 1.5% Monoethanolamine | 1.5% Diethanolamine | No Additive |
| 1 | 74 | 99 | 94 | |
| 2 | 62 | 99 | 94 | |
| 4 | 43 | 97 | 93 | |
| 8 | 18 | 95 | 92 | |
| 12 | 5 | 93 | 89 | |
| 16 | — | 90 | 85 | |
| 20 | — | 88 | 80 | |

¹The values obtained were in the range 0 – 5% which also is the precision of the test method.

The 3-tetradecoxypropylamine gave good adhesion in this test, compared to the control.

The alkanolamine further improved the thermal stability of the asphalt solutions containing 3-tetradecoxypropylamine. The adhesion after 20 days at 130°C in the case of each alkanolamine tested was superior to that which is obtained using 3-decoxypropylamine alone after 1 day at the same temperature.

EXAMPLES 17 to 19

EXAMPLE 17

To 200g. of the same asphalt solution used in the tests of Example 1, there were added 3g. of 3-(decoxydioxyethylene) oxypropylamine. The asphalt solution was then stored at 130°C for 12 days. Samples of the composition were removed at 1 day, 2 days, 4 days, 8 days, and 12 days, and tested for adhesion to aggregate, using the test procedure outlined in Example 1. The results are reported in Table V.

EXAMPLE 18

A similar composition was prepared using 3g. of 3-(decoxydioxyethylene) oxypropylamine and 3g. of monoethanolamine, and these results are also reported in Table V.

EXAMPLE 19

Similarly, an asphalt composition was prepared using 3g. of 3-(decodydioxythylene) oxypropylamine and 3g. of diethanolamine. The test results are reported in Table V.

TABLE V

| Example No: | 17 | 18 | 19 | Control |
|---|---|---|---|---|
| | Adhesion % | | | |
| Ether Amine Additive: 1.5% 3-(decoxydioxyethylene)-oxypropylamine | | | | |
| Days at 130°C | No Alkanolamine | 1.5% Monoethanolamine | 1.5% Diethanolamine | No Additive |
| 1 | 89 | 100 | 96 | |
| 2 | 60 | 99 | 95 | |
| 4 | 25 | 98 | 93 | |
| 9 | 4 | 97 | 91 | |
| 12 | — | 97 | 89 | |

¹The values obtained were in the range 0 – 5% which also is the precision of the test method.

The 3-(decoxydioxyethylene) oxypropylamine gave good adhesion in this test compared to the control.

The alkanolamine further improved the thermal stability of the asphalt solutions containing the ether amine. The adhesion after 12 days at 130°C in the case of each of the alkanolamines tested was equal or superior to that obtained using the ether amine alone, after 1 day at the same temperature.

Having regard to the foregoing disclosure, the following is claimed as the inventive and patentable embodiments thereof:

1. An asphalt composition having improved adhesion to aggregate comprising asphalt and an amount to improve the adhesion of the asphalt to aggregate of an ether amine having the formula:

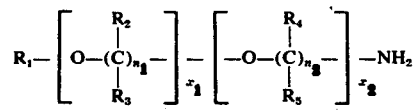

wherein:
R₁ is a hydrocarbon group having from about six to about 16 carbon atoms and selected from the group consisting of alkyl and alkenyl;
R₂, R₃, R₄ and R₅ are selected from the group consisting of hydrogen and alkyl radicals having from one to about two carbon atoms;
$n_1$ and $n_2$ are numbers within the range from one to about four;
$x_1$ and $x_2$ are numbers within the range from zero to about five, the sum of $x_1$ and $x_2$ being from one to five;
the total number of carbon atoms in each

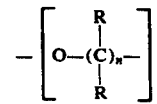

unit being from one to about four.

2. An asphalt composition according to claim 1 in which the ether amine R₁ is an alkyl group having from eight to about 14 carbon atoms, the number of carbon atoms in each

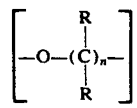

unit is two or three, $x_1$ is one, and $x_2$ is zero.

3. An asphalt composition according to claim 1 in which the ether amine is 3-decoxypropylamine.

4. An asphalt composition according to claim 1 in which the ether amine is 3-octoxypropylamine.

5. An asphalt composition according to claim 1 in which the ether amine is 3-tetradecoxypropylamine.

6. An asphalt composition according to claim 1 in which the amount of ether amine is within the range from about 0.1 to about 10% by weight of the asphalt.

7. An asphalt composition according to claim 1 in which also includes an alkanolamine in an amount to improve the adhesion of the asphalt to aggregate, having the formula:

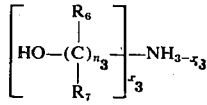

wherein:
$R_6$ and $R_7$ are selected from the group consisting of hydrogen and alkyl groups having from one to about two carbon atoms;
$n_3$ is a number within the range from two to about four;
$x_3$ is a number within the range from one to about three;
the total number of carbon atoms in each

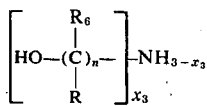

unit being within the range from two to four.

8. An asphalt composition according to claim 7 in which the alkanolamine is an ethanolamine.

9. An asphalt composition according to claim 7 in which the amount of alkanolamine is within the range from about 10 to about 70% by weight of the ether amine.

10. An asphalt composition according to claim 1 in which the asphalt is asphalt cement.

11. An asphalt composition according to claim 1 in which the asphalt is dissolved in a hydrocarbon solvent.

12. An asphalt composition according to claim 1 in which the asphalt is emulsified with water.

13. An asphalt composition according to claim 1, comprising an amount of alkanolamine within the range from about 0 to about 90% by weight of the ether amine.

14. A process for improving the adhesion of asphalt to aggregate which comprises combining aggregate and asphalt with an ether amine having the formula:

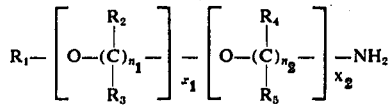

wherein:

$R_1$ is a hydrocarbon group having from about six to about 16 carbon atoms and selected from the group consisting of alkyl and alkenyl;
$R_2$, $R_3$, and $R_4$ and $R_5$ are selected from the group consisting of hydrogen and alkyl radicals having from one to about two carbon atoms;
$n_1$ and $n_2$ are numbers within the range from one to about four;
$x_1$ and $x_2$ are numbers within the range from zero to about five, the sum of $x_1$ and $x_2$ being from one to five;
the total number of carbon atoms in each

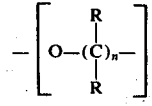

unit being from one to about four.

15. A process according to claim 14, in which the asphalt is mixed with aggregate in the proportion of from 4 to 10 parts by weight of asphalt to 96 to 90 parts by weight of aggregate at a temperature in the range of from 280°F to 350°F.

16. A process according to claim 14 which comprises combining aggregate and asphalt with an ether amine and with an alkanolamine having the formula:

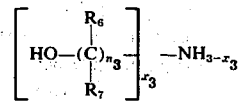

wherein:
$R_6$ and $R_7$ are selected from the group consisting of hydrogen and alkyl groups having from one to about two carbon atoms;
$n_3$ is a number within the range from two to about four;
$x_3$ is a number within the range from one to about three;
the total number of carbon atoms in each

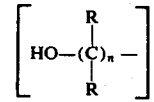

unit being within the range from two to four.

17. A process according to claim 16 in which the alkanolamine is an ethanolamine.

18. A process according to claim 14 in which the ether amine $R_1$ is an alkyl group having from eight to about 14 carbon atoms, the number of carbon atoms in each

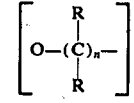

unit is two or three, $x_1$ is one, and $x_2$ is zero.

19. A process according to claim 14 in which the amount of ether amine is within the range from about 0.1 to about 10% by weight of the asphalt.

* * * * *

UNITED STATES PATENT OFFICE
CERTIFICATE OF CORRECTION

Patent No. 3,928,061  Dated December 23, 1975

Inventor(s) Karl Martin Edvin Hellsten et al

It is certified that error appears in the above-identified patent and that said Letters Patent are hereby corrected as shown below:

[73] Page 1, "Mo och Damsjo" should be --Mo och Domsjo--.

[73] Page 1, "Ornskaldsvit" should be --Ornskoldsvik--.

[56] Page 1, under References Cited, "Groove et al" should be --De Groote et al--.

Column 1, line 57,

"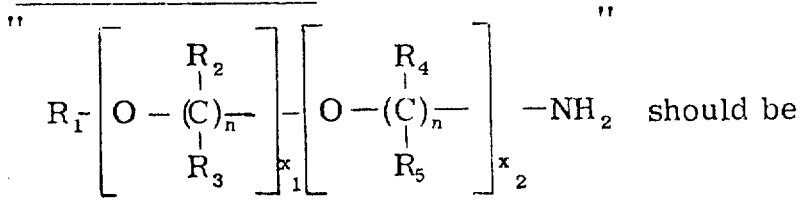" should be

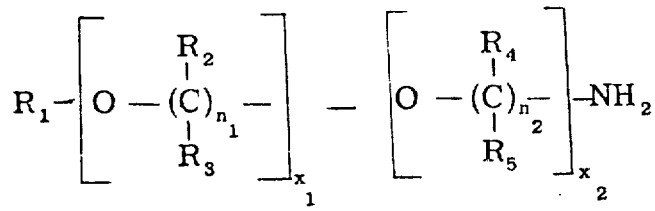

UNITED STATES PATENT OFFICE
CERTIFICATE OF CORRECTION

Patent No. 3,928,061   Dated December 23, 1975

Inventor(s) Karl Martin Edvin Hellsten et al

It is certified that error appears in the above-identified patent and that said Letters Patent are hereby corrected as shown below:

Column 3, line 10, 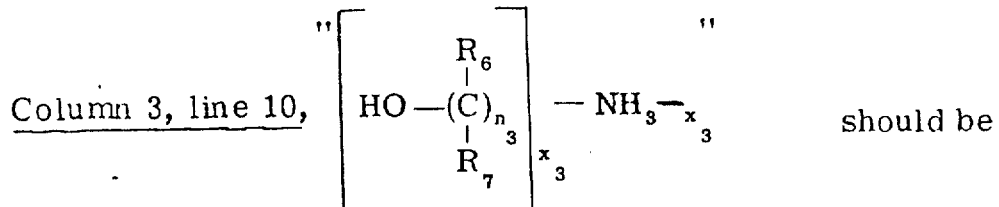 should be

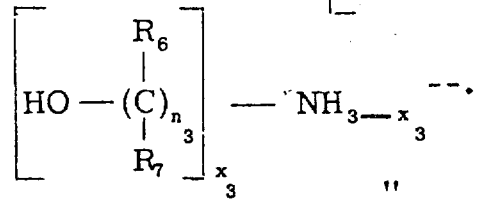

Column 3, line 25, 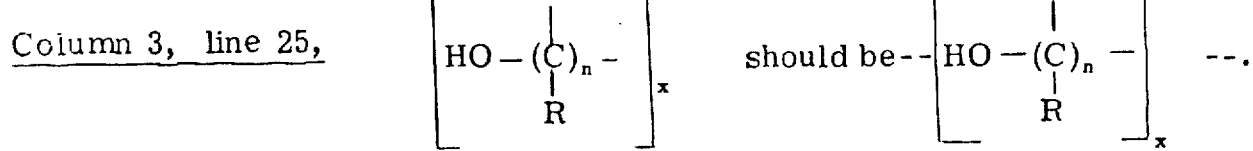

Column 10, line 35, 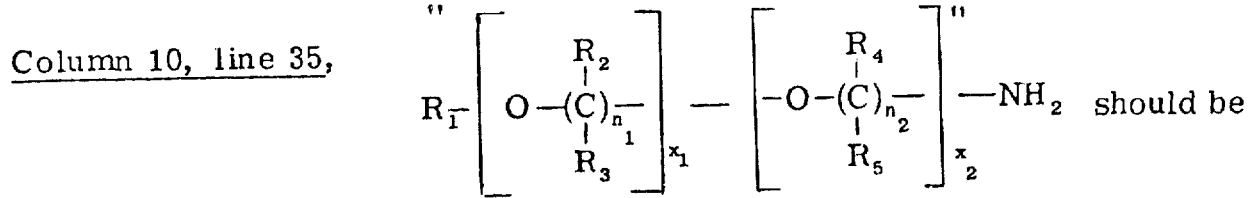 should be

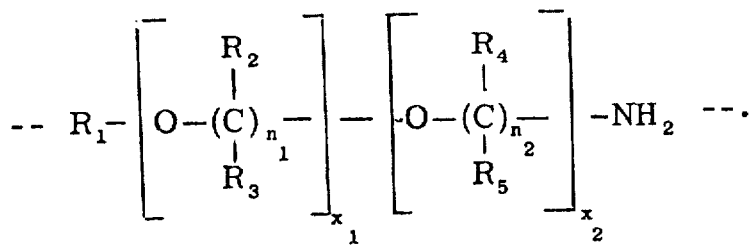

UNITED STATES PATENT OFFICE
CERTIFICATE OF CORRECTION

Patent No. 3,928,061  Dated December 23, 1975

Inventor(s) Karl Martin Edvin Hellsten et al

It is certified that error appears in the above-identified patent and that said Letters Patent are hereby corrected as shown below:

Column 11, line 35, 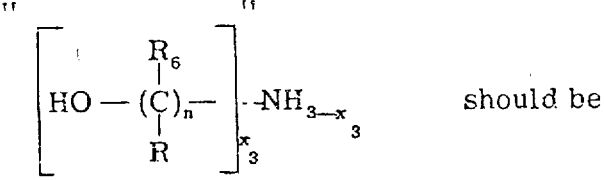 should be

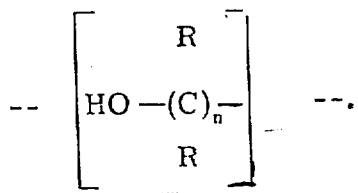

Column 11, line 60, 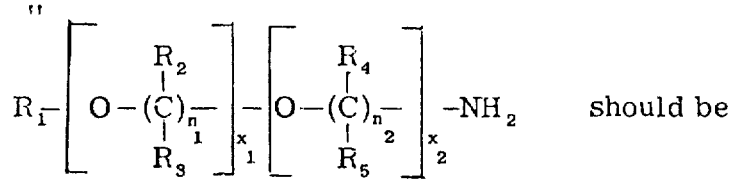 should be

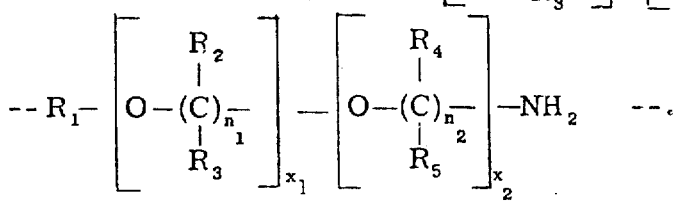

Column 12, line 30, 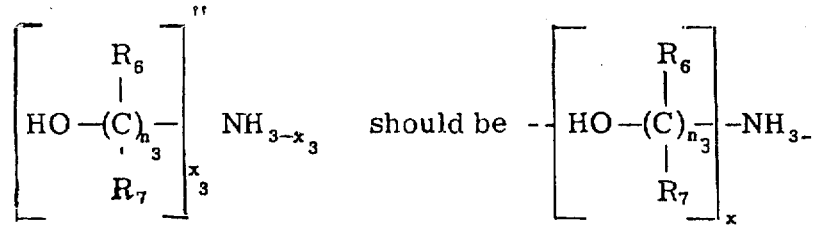 should be 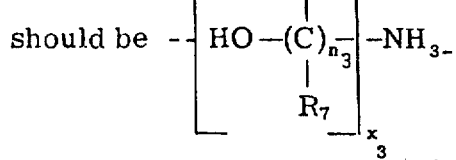

Signed and Sealed this

Nineteenth Day of October 1976

[SEAL]

Attest:

RUTH C. MASON
Attesting Officer

C. MARSHALL DANN
Commissioner of Patents and Trademarks